(12) United States Patent
Matsumoto

(10) Patent No.: US 10,875,363 B2
(45) Date of Patent: Dec. 29, 2020

(54) STUD PIN AND STUDDED TIRE

(71) Applicant: The Yokohama Rubber Co., LTD., Tokyo (JP)

(72) Inventor: Kenichi Matsumoto, Hiratsuka (JP)

(73) Assignee: The Yokohama Rubber Co., Ltd.

( * ) Notice: Subject to any disclaimer, the term of this patent is extended or adjusted under 35 U.S.C. 154(b) by 412 days.

(21) Appl. No.: 15/775,364

(22) PCT Filed: Feb. 16, 2016

(86) PCT No.: PCT/JP2016/054446
§ 371 (c)(1),
(2) Date: May 10, 2018

(87) PCT Pub. No.: WO2017/081873
PCT Pub. Date: May 18, 2017

(65) Prior Publication Data
US 2018/0319220 A1 Nov. 8, 2018

(30) Foreign Application Priority Data
Nov. 13, 2015 (JP) .................................. 2015-222569

(51) Int. Cl.
*B60C 11/16* (2006.01)
*B60C 11/03* (2006.01)

(52) U.S. Cl.
CPC .......... *B60C 11/1668* (2013.01); *B60C 11/16* (2013.01); *B60C 11/1625* (2013.01);
(Continued)

(58) Field of Classification Search
CPC . B60C 11/1668; B60C 11/1643; B60C 11/16; B60C 11/1675; B60C 11/1656
See application file for complete search history.

(56) References Cited

U.S. PATENT DOCUMENTS

2004/0163746 A1\* 8/2004 Eromaki ............. B60C 11/1643
152/210
2016/0046156 A1 2/2016 Matsumoto

FOREIGN PATENT DOCUMENTS

FR          437275 A  *  4/1912  ............. B60C 11/16
GB      191513905 A  * 10/1916  ............. B60C 11/16
(Continued)

OTHER PUBLICATIONS

International Search Report for International Application No. PCT/JP2016/054446 dated Apr. 5, 2016, 2 pages, Japan.

*Primary Examiner* — Justin R Fischer
*Assistant Examiner* — Philip N Schwartz
(74) *Attorney, Agent, or Firm* — Thorpe North & Western

(57) ABSTRACT

A stud pin includes a tip and a body portion provided around a center axis of the stud pin. The body portion includes an upper flange, a lower flange, and a shank portion connecting the upper flange and the lower flange. A first side surface of the lower flange includes a first curved surface recessed inward in relation to the body portion. A second side surface of the upper flange includes a second curved surface bulging toward a periphery of the body portion, and a pair of flat surfaces configured to connect the second curved surface to interpose the second curved surface. A trough portion where the first curved surface is most recessed and a peak portion where the second curved surface is most bulged are located at an identical orientation position about the center axis as viewed from the axial direction.

15 Claims, 5 Drawing Sheets

(52) U.S. Cl.
CPC ...... *B60C 11/1643* (2013.01); *B60C 11/1675* (2013.01); *B60C 11/0302* (2013.01); *B60C 2011/0353* (2013.01); *B60C 2011/0355* (2013.01)

(56) References Cited

FOREIGN PATENT DOCUMENTS

| | | |
|---|---|---|
| JP | 2015-136942 | 7/2015 |
| WO | WO 2015/114813 | 8/2015 |

* cited by examiner

STUD PIN AND STUDDED TIRE

TECHNICAL FIELD

The present technology relates to a stud pin for mounting in a tread portion of a pneumatic tire, and a studded tire mounted with the stud pin.

BACKGROUND ART

A snow tire in the related art provides grip on icy road surfaces via stud pins mounted in a tread portion of the pneumatic tire.

Typically, a stud pin is embedded in a pin embedding hole (also simply referred to as hole below) provided in the tread portion. When a stud pin is embedded in the hole, the hole expands in diameter. By inserting the stud pin into the hole in this state, the stud pin is firmly embedded in the hole. As a result, the stud pin is prevented from falling out from the hole due to receiving breaking or accelerating forces or lateral forces from the road surface when the pneumatic tire rolls.

The stud pin fall outs from the pneumatic tire when the tip of stud pin receives force from the road surface and the stud pin rotates in the hole. For this reason, it is preferable for the stud pin not to rotate in the hole to prevent the stud pin from falling out. On this point, many stud pins include an upper flange and a lower flange with a polygonal outer shape with pointed projections. This configuration can prevent rotation of the stud pin in the hole to a degree, but the prevention of rotation is not sufficient. Accordingly, technology has been proposed to make stud pins more resistant to rotation in the holes.

For example, technology is known (International Patent Publication No. WO 2015/114813) that, to prevent rotation of a stud pin, includes a curved recessed portion in a side surface of an upper flange and a lower flange of the stud pin which is filled by a tread rubber. With this technology that includes the curved recessed portion in the side surface of the upper flange and the lower flange of the stud pin, the stud pin may still rotate and fall out due to the tread rubber insufficiently filling some portions of the recessed portion, resulting in the tread rubber being gripped with insufficient force by the side surface of the stud pin.

SUMMARY

The present technology provides a stud pin that is resistant to falling out from a studded tire, when compared to stud pins and a studded tire including the stud pin in the related art.

An aspect of the present technology is a stud pin to be embedded in a pin embedding hole provided in a tread portion of a pneumatic tire. The stud pin includes a tip including a tip end surface configured to come into contact with a road surface and a body portion provided around a center axis of the stud pin and configured to support the tip.

The body portion includes an upper flange configured to fix the tip at a first end of the body portion, a lower flange provided on a position on a side opposite to the first end of the body portion, and a shank portion configured to connect the upper flange and the lower flange. The upper flange and the lower flange each include a side surface extending parallel with an axial direction of the center axis.

A first side surface of the side surface of the lower flange includes a first curved surface recessed inward in relation to the body portion as viewed from the axial direction, and a second side surface of the side surface of the upper flange includes a second curved surface bulging toward a periphery of the body portion as viewed from the axial direction, and a pair of third curved surfaces or flat surfaces configured to connect the second curved surface to interpose the second curved surface, each of the pair of the third curved surfaces or the flat surfaces having a smaller curvature along a periphery of the second side surface orthogonal to the axial direction than a curvature of the second curved surface.

A trough portion where the first curved surface is most recessed and a peak portion where the second curved surface is most bulged are located at an identical orientation position about the center axis as viewed from the axial direction.

When the peak portion and the trough portion are viewed from the axial direction, a position of the peak portion is preferably aligned with a position of the trough portion or located on an inward side of the position of the trough portion in relation to the body portion.

When the peak portion and the trough portion are viewed from the axial direction, a distance between the first curved surface and the second curved surface is preferably reduced to a minimum distance at a position of the peak portion and a position of the trough portion.

Counting the first curved surface and the second curved surface as one set, the first side surface and the second side surface preferably include at least two sets.

Counting the first curved surface and the second curved surface as one set, the first side surface and the second side surface preferably include two sets, and the two first curved surfaces of the two sets are provided, at positions opposite one another regarding the center axis, on a periphery of the side surface.

Counting the first curved surface and the second curved surface as one set, the first side surface and the second side surface preferably include four sets, trough portions of four first curved surfaces of the four sets are provided at equal angular intervals about the center axis on a periphery of the first side surface, and the peak portions of the four second curved surfaces of the four sets are provided at equal angular intervals about the center axis on the periphery of the second side surface.

When at least two of peak portions and trough portions of at least two sets of the first side surface and the second side surface are viewed from the axial direction, positions of both of the at least two of the peak portions are preferably aligned with the position of one of the at least two of the trough portions or located on an inward side of a position of a closest trough portion of the at least two of the trough portions in relation to the body portion.

When the first side surface is viewed from the axial direction, an outer shape of the first side surface preferably includes a plurality of sides which are recessed and curved and a rounded protrusion portion provided between adjacent sides of the plurality of sides.

When the second side surface is viewed from the axial direction, an outer shape of the second side surface preferably includes a plurality of sides and a rounded protrusion portion provided between adjacent sides of the plurality of sides.

Another aspect of the present technology is a studded tire including the stud pin described above, the stud pin being mounted in a pin embedding hole provided in a tread portion.

In the studded tire, an edge shape of the tip as viewed from the axial direction of the center axis preferably includes at least a protrusion portion, and an orientation position about the center axis of the protrusion portion of the edge shape is away from the orientation position about the center axis of the peak portion of the second curved surface.

In the studded tire, a recessed portion is preferably provided on the edge shape at an identical orientation position about the center axis as the peak portion.

In a studded tire including the stud pin described above, the stud pin being mounted in a pin embedding hole provided in a tread portion, at least two of trough portions of the at least two sets of the first side surface and the second side surface are preferably located opposite one another regarding the center axis and lying on a straight line parallel with a tire circumferential direction or a tire lateral direction.

In the studded tire, an edge shape of the tip as viewed from the center axis preferably includes at least a protrusion portion, and an orientation position about the center axis of the protrusion portion of the edge shape is away from the orientation position about the center axis of the at least two of peak portions of the at least two sets of the first side surface and the second side surface.

In the studded tire, a recessed portion is preferably provided on the edge shape at an orientation position about the center axis identical to the at least two of peak portions of the at least two sets of the first side surface and the second side surface.

According to an aspect of the stud pin and the studded tire described above, the stud pin is resistant to falling out from the studded tire.

DETAILED DESCRIPTION

Overall Description of Tire

Figure 1:
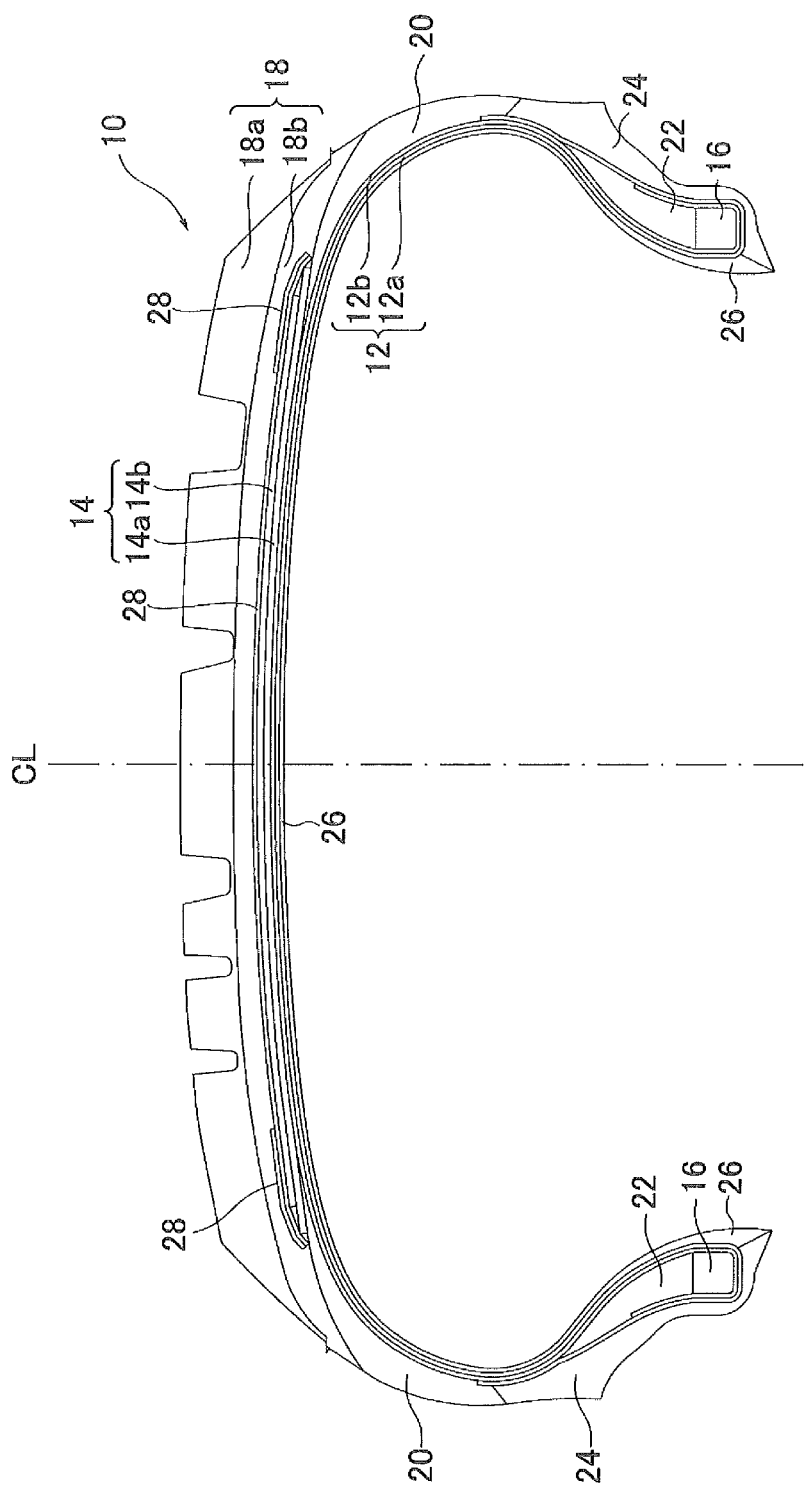
FIG. 1 is a tire cross-sectional view illustrating an example of a cross-section of a studded tire of a present embodiment.

Hereinafter, a studded tire of the present embodiment is described. FIG. 1 is a tire cross-sectional view illustrating an example of a cross section of a studded tire (hereinafter, also referred to as a "tire") 10 of the present embodiment. The tire 10 is a tire with stud pins embedded in a tread portion (the stud pins are not illustrated in FIG. 1).

The tire 10 is, for example, a tire for a passenger vehicle. A tire for a passenger vehicle refers to a tire specified in Chapter A of the JATMA Year Book 2012 (standards of The Japan Automobile Tyre Manufacturers Association, Inc.). The tire can also be a small truck tire specified in Chapter B or a truck tire or bus tire specified in Chapter C.

Below, values of the dimensions of various pattern elements are described in detail as example values for a tire for a passenger vehicle. However, the studded tire is not limited to these example values.

"Tire circumferential direction" described below refers to the direction (both rotation directions) the tread surface rotates when the tire 10 rotates about the tire rotation axis. "Tire radial direction" refers to the direction that extends radially orthogonal to the tire rotation axis. "Outward in the tire radial direction" refers to the direction away from the tire rotation axis in the tire radial direction. "Tire lateral direction" refers to the direction parallel with the tire rotation axis direction. "Outward in the tire lateral direction" refers to both sides away from a tire centerline CL of the tire 10.

"Inner side of a body portion of a stud pin" refers a center axis side of the periphery of a body portion.

Tire Structure

The tire 10 includes a carcass ply layer 12, a belt layer 14, and bead cores 16 as framework members. The tire 10 also mainly includes a tread rubber 18, side rubbers 20, bead filler rubbers 22, rim cushion rubbers 24, and an innerliner rubber 26 around the framework members.

The carcass ply layer 12 includes carcass ply members 12a and 12b that are formed from organic fibers covered with rubber and that are wound between the pair of bead cores 16 of an annular shape so as to be formed into a toroidal shape. In the tire 10 illustrated in FIG. 1, the carcass ply layer 12 is made of the carcass ply members 12a and 12b, but may also be made of a single carcass ply member. The belt layer 14 is provided outward of the carcass ply layer 12 in the tire radial direction, and is constituted by two belt members 14a and 14b. The belt layer 14 is a member formed from steel cords covered with rubber, the steel cords being arranged inclined at a predetermined angle, for example, 20 to 30 degrees, with respect to the tire circumferential direction. The width in the tire lateral direction of the belt member 14a, which is a lower layer, is greater than the width of the belt member 14b, which is the upper layer. The extension direction of the steel cords of the two layers of the belt members 14a and 14b are inclined from the tire circumferential direction toward the tire lateral direction in mutually different directions. As such, the belt members 14a and 14b are crossing layers serving to prevent expansion of the carcass ply layer 12 due to the pressure of the air filled in the tire.

The tread rubber 18 is disposed outward of the belt layer 14 in the tire radial direction. Both end portions of the tread rubber 18 connect to the side rubbers 20 to form sidewall portions. The tread rubber 18 includes two layers of rubber, namely an upper layer tread rubber 18a provided on the outer side in the tire radial direction and a lower layer tread rubber 18b provided on the inner side in the tire radial direction. The rim cushion rubbers 24 are provided at the ends of the side rubbers 20 on the inner side in the tire radial direction, and come into contact with the rim on which the tire 10 is mounted. The bead filler rubbers 22 are provided on the outer side in the tire radial direction of the bead cores 16 so as to be interposed between a portion of the carcass ply layer 12 prior to being wound around the bead cores 16 and a portion of the carcass ply layer 12 after being wound around the bead cores 16. The innerliner rubber 26 is provided on the inner surface of the tire 10 facing a tire cavity region that is filled with air and is surrounded by the tire 10 and the rim.

In addition, the tire 10 includes a belt cover layer 28 formed from organic fiber covered with rubber that covers the belt layer 14 from the outer side in the tire radial direction of the belt layer 14.

The tire 10 has such a tire structure, but the tire structure of the present embodiment is not limited to the tire structure illustrated in FIG. 1.

Tread Pattern

Figure 2:
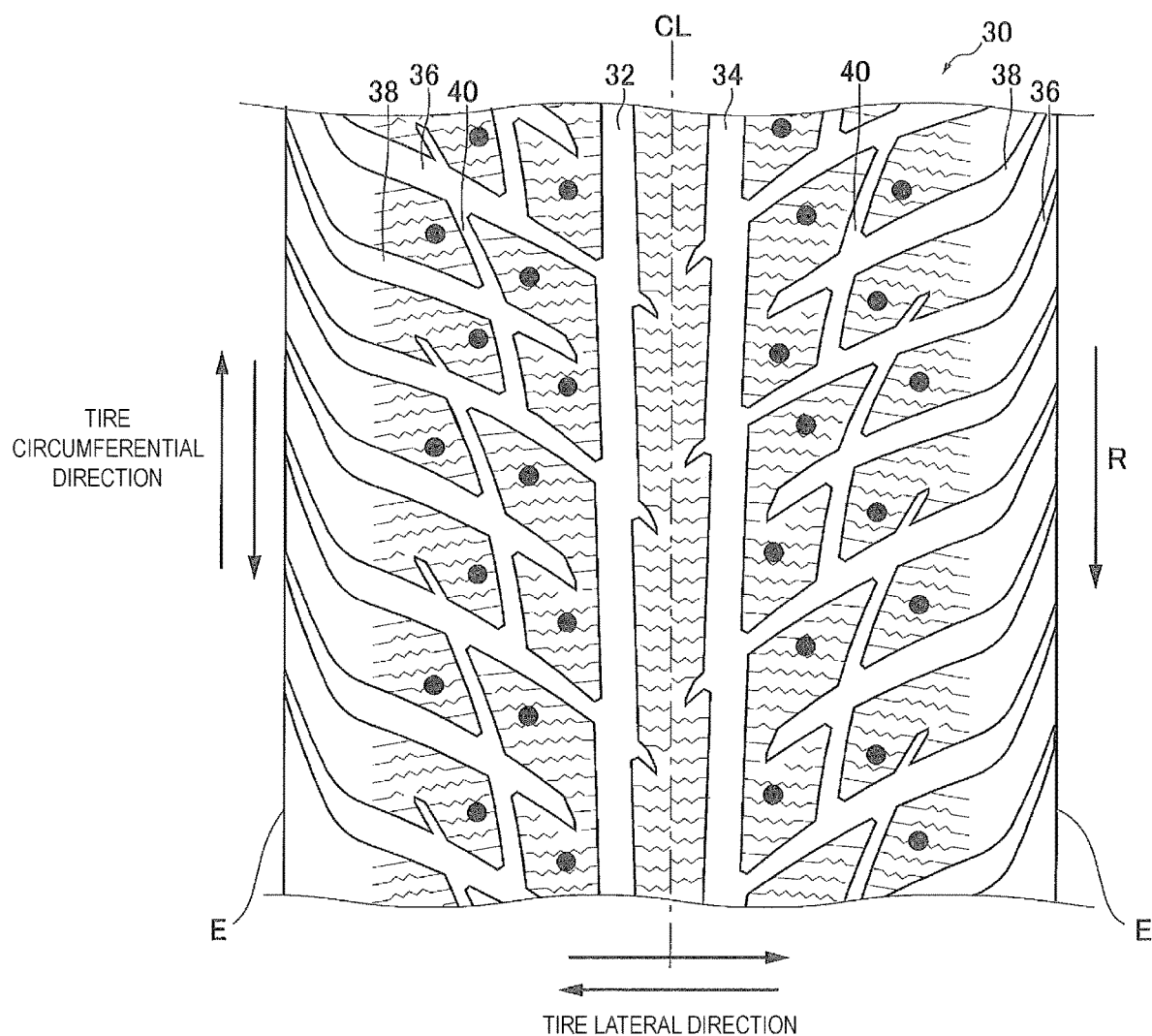
FIG. 2 is a developed plan view illustrating a portion of an example of a tread pattern of the studded tire of the present embodiment, developed on a plane.

FIG. 2 is a planar development diagram illustrating a portion of an example of the tread pattern, namely a tread pattern 30, of the tire 10 developed on a plane. As illustrated in FIG. 2, the tire 10 has a first orientation in the tire circumferential direction designated by rotation direction R. Orientation information of the rotation direction R is indicated by an information display portion including numbers, symbols, and the like on the sidewall surface of the tire 10. In FIG. 2, stud pins mounted in the tread portion are omitted from the drawing. The stud pins (see FIG. 3A) are mounted in pin embedding holes (black dot portions in FIG. 2) illustrated in FIG. 2.

The tread pattern 30 includes circumferential main grooves 32 and 34, a first inclined groove 36, a second inclined groove 38, and a third inclined groove 40. A plurality of the first inclined grooves 36, a plurality of the second inclined grooves 38, and a plurality of the third inclined grooves 40 are each formed at predetermined intervals in the tire circumferential direction (the vertical direction in FIG. 2).

The circumferential main grooves 32 and 34 are disposed an equal distance separate from the tire centerline CL outward in the tire lateral direction and extend in a linear manner in the tire circumferential direction.

The first inclined groove 36 extends from a region of a tire land portion between the circumferential main grooves 32 and 34 in the direction (upward in FIG. 2) opposite the tire rotation direction R, which is one direction in the tire circumferential direction. The first inclined groove 36 crosses the circumferential main groove 32 or 34 and extends outward in the tire lateral direction. The first inclined groove 36 extends to a tire shoulder region of the tread portion gradually increasing in groove width, in the shoulder region sharply change in inclination angle, then extends in the tire circumferential direction, specifically in the direction opposite the tire rotation direction R, ending at a pattern end E.

The second inclined groove 38 extends, from a region of a land portion located outward in the tire lateral direction of the circumferential main grooves 32 and 34, in the direction (upward in FIG. 2) opposite the tire rotation direction R, and also extends outward in the tire lateral direction. The second inclined groove 38 is formed parallel with the first inclined groove 36. The second inclined groove 38 extends to the tire shoulder region of the tread portion gradually increasing in groove width, in the shoulder region sharply changes in inclination angle, then extend in the tire circumferential direction, specifically in the direction opposite the tire rotation direction R, ending at the pattern end E. The second inclined groove 38 is disposed between two of the first inclined grooves 36 adjacent in the tire circumferential direction.

The third inclined groove 40 extends from a position partway along the first inclined groove 36 and passes through the second inclined groove 38 adjacent to the first inclined groove 36 in the tire circumferential direction, and passes through the first inclined groove 36 adjacent to the second inclined groove 38 in the tire circumferential direction, closing in the tire shoulder region. The third inclined groove 40 extends in the direction (upward in FIG. 2) opposite the tire rotation direction R, which is one direction in the tire circumferential direction, and also extends outward in the tire lateral direction.

In the tread pattern 30, stud pins 50 described below are mounted in pin embedding holes (black dot portions in FIG. 2).

The circumferential main grooves 32 and 34, the first inclined grooves 36, the second inclined grooves 38, and the third inclined grooves 40 have groove depths ranging of from, for example, 8.5 mm to 10.5 mm, and have groove widths of a maximum of 12 mm. The tread pattern illustrated in FIG. 2 is an example, and the tread pattern of the tire in which the stud pins of the present embodiment are mounted is not limited to the embodiment illustrated in FIG. 2.

Stud Pin

Figure 3A:
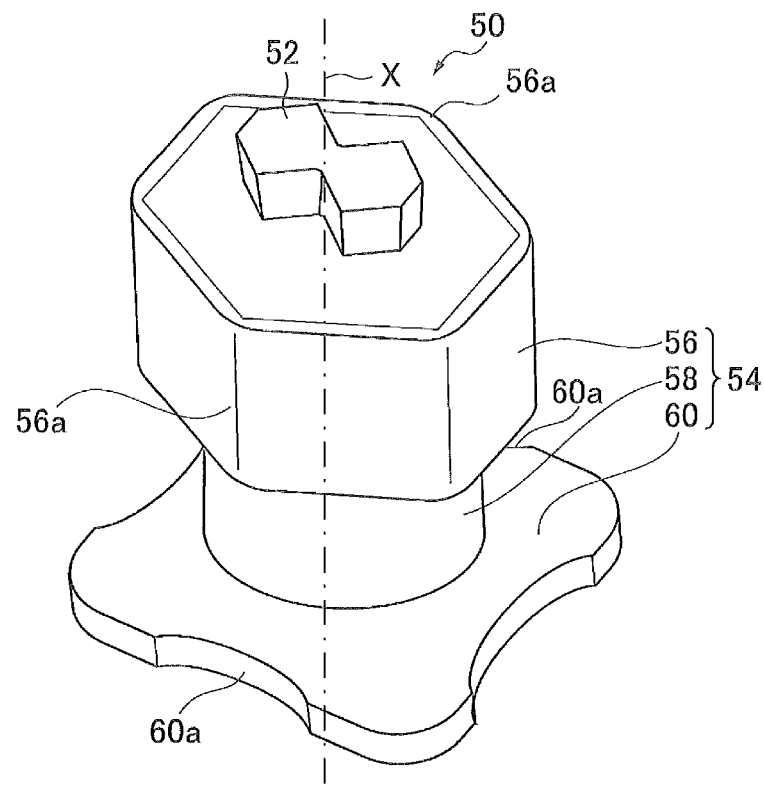
FIGS. 3A and 3B are diagrams illustrating examples of the stud pin of the present embodiment.
Figure 3B:
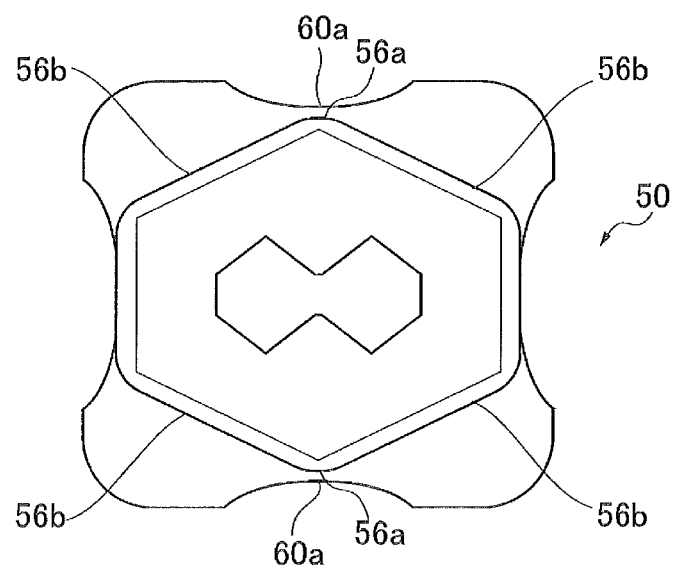

FIGS. 3A and 3B are diagrams illustrating examples of the stud pin 50 of the present embodiment. FIG. 3A is a perspective view of the stud pin 50. FIG. 3B is a plan view of the stud pin 50 as viewed from the axial direction of a center axis X of the stud pin 50.

The stud pin 50 includes a tip 52 and a body portion 54. The body portion 54 includes an upper flange 56, a shank portion 58, and a lower flange 60. When mounted in the pin embedding holes of the tire 10, the body portion 54 is embedded in the tread rubber 18 and is in contact with the tread rubber 18.

The tip 52 includes a tip end surface that comes into contact with a road surface. The tip 52 is formed from tungsten carbide or a similar hard metal. Additionally, the tip 52 may be formed from a cermet material. The tip 52 is fit and fixed in a hole provided in the upper end surface of the body portion 54. The tip 52 of the stud pin 50 is configured to protrude from the tread surface when the stud pin 50 is mounted in the tire 10.

The body portion 54 supports the tip 52 and is provided around the center axis X. The upper flange 56 of the body portion 54 is configured so that, when embedded in the tread portion of the tire 10, the tip 52 protrudes from the tread surface. The tip 52 is fixed to a first end (in FIG. 3A, the end on the upper side of the diagram) of the body portion 54, which is the end of the upper flange 56.

The lower flange 60 is configured to come into contact with a bottom of the pin embedding hole, when embedded in the tread portion of the tire 10. The lower flange 60 is provided at a position on the side opposite the first end of the body portion 54.

The shank portion 58 is a portion that connects the upper flange 56 and the lower flange 60. The shank portion 58 has a narrower cross section than the upper flange 56 and the lower flange 60.

Material of the body portion 54 is not particularly limited and, for example, the body portion 54 may be formed from aluminum alloy or the like in order to reduce the weight of the stud pin 50.

The center axis X runs through the centroid of each cross section of the body portion 54, which are orthogonal to the extension direction of the body portion 54.

Here, the upper flange 56 and the lower flange 60 of the body portion 54 include side surfaces extending in parallel with the axial direction of the center axis X of the stud pin 50. Of the side surfaces, a first side surface of the lower flange 60 includes a first curved surface 60a that is recessed inward in relation to the body portion 54 (in the direction toward the center axis X), as viewed from the axial direction. In other words, the first side surface has a shape as viewed from the axial direction that is a curved line recessed in the direction toward the center axis X.

Additionally, of the side surfaces, a second side surface of the upper flange 56 includes a second curved surface 56 that bulges toward the periphery of the body portion 54 (in the direction away from the center axis X) as viewed from the axial direction, and a flat surface 56b on either side of the second curved surface 56a connected thereto. In other words, the second side surface has a shape, as viewed from the axial direction, that is a curved line bulging outward in the direction away from the center axis X. Instead of the flat surface 56*b*, a curved surface (third curved surface) with a smaller curvature along the periphery orthogonal to the axial direction than the second curved surface 56*a* can be used.

As illustrated in FIG. 3B, in the present embodiment, a trough portion where the first curved surface 60*a* is most recessed and a peak portion where the second curved surface 56*a* is most bulged are located at the same orientation position about the center axis X when viewed from the axial direction.

Figure 4:
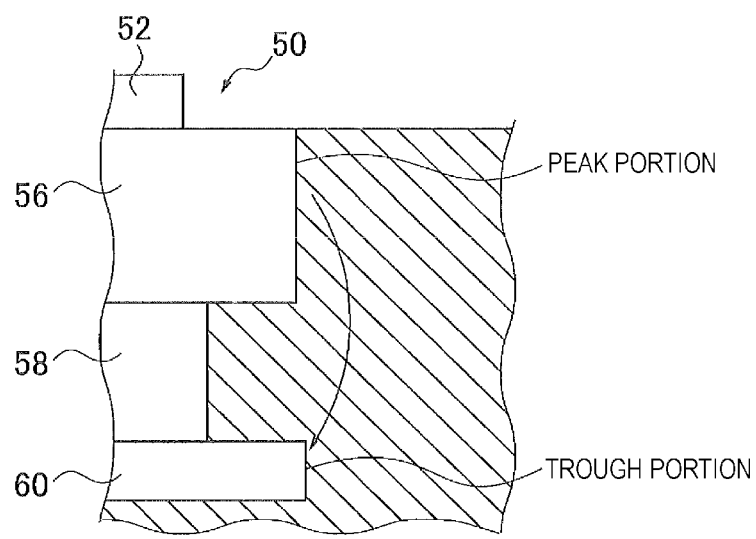
FIG. 4 is a diagram schematically illustrating a movement of a tread rubber around the stud pin of the present embodiment.

In this way, the trough portion of the first curved surface 60*a* of the lower flange 60 is located at the same orientation position as the peak portion of the second curved surface 56*a* of the upper flange 56. This makes the stud pin 50 resistant to falling out from the tire 10. FIG. 4 is a diagram schematically illustrating a movement of the tread rubber around the stud pin 50 of the present embodiment when the stud pin 50 is embedded in the pin embedding hole. By the peak portion being provided on the second curved surface 56*a* of the upper flange 56 of the stud pin 50, the tread rubber is easily pushed outward. Also, by the trough portion being provided at the same orientation position as the peak portion on the first curved surface 60*a* of the lower flange 60, the tread rubber pushed outward readily moves toward the trough portion of the first curved surface 60*a*. Accordingly, the movement of the tread rubber as indicated by the arrow in FIG. 4 readily occurs. In other words, as illustrated in FIG. 4, the tread rubber moves from the tread surface toward the inside of the tread rubber (inward in the tire radial direction). The movement of the tread rubber is in the direction opposite the direction the stud pin 50 falls out. Thus, in the present embodiment, the stud pin 50 is resistant to falling out from the tire 10.

Figure 5:
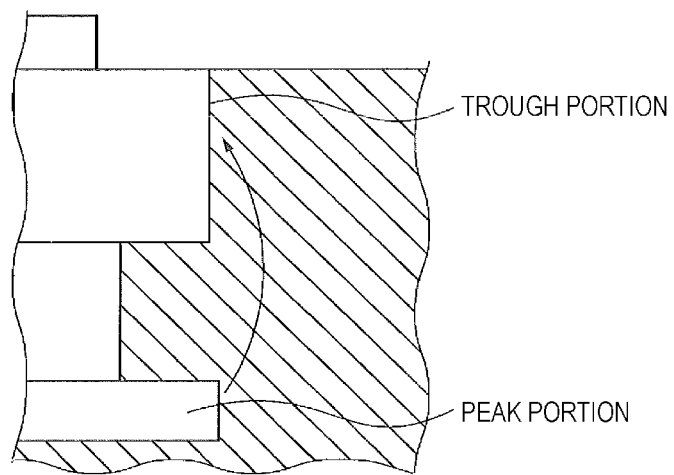
FIG. 5 is a diagram schematically illustrating a movement of a tread rubber around a known stud pin.

FIG. 5 is a diagram schematically illustrating a movement of a tread rubber around a known stud pin that includes a trough portion on a side surface of an upper flange and a peak portion on a side surface of a lower flange. As illustrated in FIG. 5, the tread rubber is easily pushed outward from the peak portion of the lower flange. Also, by the trough portion being provided at the same orientation position on the side surface of the upper flange, the tread rubber pushed outward by the lower flange readily moves toward the trough portion of the upper flange. Thus, as illustrated in FIG. 5, the tread rubber moves from the inside of the tread rubber toward the tread surface (outward in the tire radial direction). The movement of the tread rubber is in the same direction as the direction the stud pin falls out. Thus, in a configuration in which the trough portion is provided on the side surface of the upper flange and the peak portion is provided on the side surface of the lower flange, the stud pin falls out from the tire easier than in the opposite configuration.

Accordingly, in the present embodiment, the trough portion of the first curved surface 60*a* of the lower flange 60 is located at the same orientation position as the peak portion of the second curved surface 56*a* of the upper flange 56.

In the present embodiment, as illustrated in FIGS. 3A and 3B, when the peak portion and the trough portion are viewed from the axial direction of the center axis X, the position of the peak portion is preferably aligned with the position of the trough portion or located on an inward side of the position of the trough portion in relation to the body portion 54 (the direction toward the center axis X). In particular, the distance between the peak portion and the center axis X is preferably from 80% to 100% of the distance between the trough portion and the center axis X. In this way, the tread rubber readily moves as illustrated in FIG. 4 and the stud pin 50 is resistant to falling out from the tire 10.

Additionally, in the present embodiment, when the peak portion of the upper flange 56 and the trough portion of the lower flange 60 are viewed from the axial direction of the center axis X, the distance between the first curved surface 60*a* and the second curved surface 56*a* is preferably reduced to the minimum distance at a position between the peak portion and the trough portion. In other words, the distance between the peak portion and the trough portion is preferably the shortest distance between the first curved surface 60*a* and the second curved surface 56*a*. In this way, the tread rubber readily moves as illustrated in FIG. 4 and the stud pin 50 is resistant to falling out from the tire 10.

Additionally, as illustrated in FIGS. 3A and 3B, counting the first curved surface 60*a* and the second curved surface 56*a* as one set, the second side surface of the upper flange 56 and the first side surface of the lower flange 60 preferably includes at least two sets. This makes the stud pin 50 resistant to falling out from the tire 10.

The second side surface of the upper flange 56 and the first side surface of the lower flange 60 preferably include two sets, with the first curved surface 60*a* and the second curved surface 56*a* being counted as one set; and two of the first curved surfaces 60*a* of two set of the first side surface and the second side surface are provided at positions opposite one another regarding the center axis X on the periphery of the first side surface. In this way, even when the tip 52 receives force from the road surface in the direction the two first curved surfaces 60*a* are disposed, the stud pin 50 is resistant to falling out.

FIGS. 6A to 6E are diagrams illustrating other examples of the stud pin of the present embodiment. In FIGS. 6A to 6E, the upper diagram is a perspective view, and the lower diagram is a plan view.

In the embodiment illustrated in FIGS. 3A and 3B, counting the first curved surface 60*a* and the second curved surface 56*a* as one set, the first side surface of the lower flange 60 and the second side surface of the upper flange 56 includes two sets. However, this embodiment in not limited to the upper flange 56 having an outer shape as illustrated in FIG. 3B with six sides and six rounded protrusion portions provided between adjacent sides, i.e., substantially a hexagon (a hexagon with rounded corner portions). As in the examples illustrated in FIGS. 6A and 6B, the outer shape of the upper flange 56 may include two sets of the first curved surface 60*a* and the second curved surface 56*a* set (two sets in the vertical direction in relation to the drawing in FIG. 6B), and may have ten sides and ten rounded protrusion portions provided between adjacent sides, with at least one of the ten sides having a recessed shape, i.e., a shape recessed inward. Additionally, as in the example illustrated in FIG. 6C, the outer shape of the upper flange 56 may include six sides with at least one side having an inwardly recessed shape.

Figure 6A:
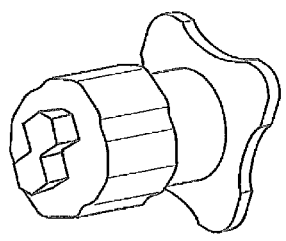
FIGS. 6A to 6E are diagrams illustrating other examples of the stud pin of the present embodiment.
Figure 6A:
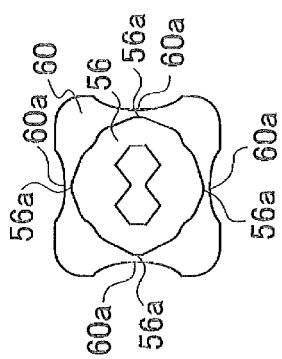
Figure 6B:
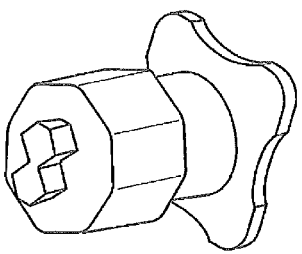
Figure 6B:
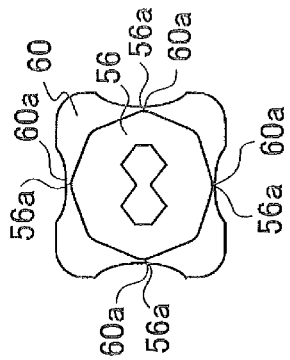
Figure 6C:
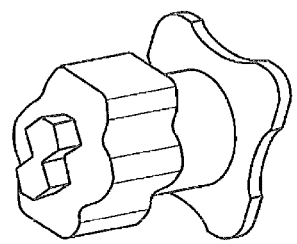
Figure 6C:
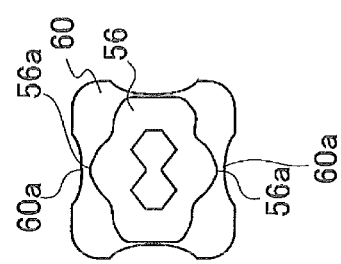
Figure 6D:
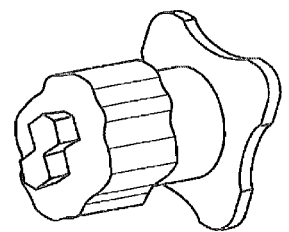
Figure 6D:
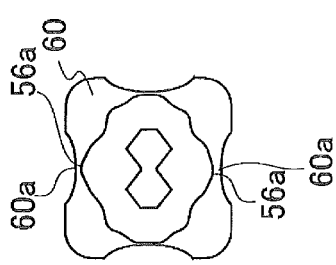
Figure 6E:
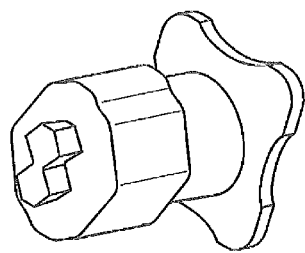
Figure 6E:
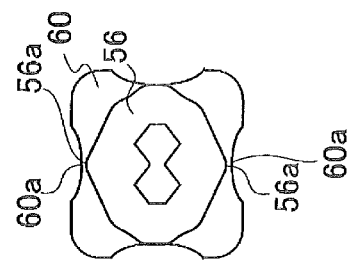

Furthermore, as illustrated in FIGS. 6D and 6E, counting the first curved surface 60*a* and the second curved surface 56*a* as one set, the first side surface of the lower flange 60 and the second side surface of the upper flange 56 may preferably include four sets. By four sets of the first curved surface 60*a* and the second curved surface 56*a* being provided, the stud pin 50 can be made more resistant to falling out. In this configuration, the trough portions of the four first curved surfaces 60*a* of the four sets are preferably provided on the periphery of the first side surface at equal angular intervals about the center axis X, specifically, at 90 degree intervals in terms of angular position; and the peak portions of the four second curved surface 56a are provided on the periphery of the second side surface at equal angular intervals about the center axis X, specifically, at 90 degree intervals in terms of angular position.

Additionally, in the present embodiment, when the peak portion and the trough portion of at least two sets of the first curved surface 60a and the second curved surface 56a are viewed from the axial direction of the center axis X, the positions of both of the at least two peak portions are preferably aligned with the position of one of the two trough portions or located on an inward side of the position of the closest trough portion in relation to the body portion 54 (the direction toward the center axis X) to further prevent the stud pin 50 falling out from the tire 10. In particular, the distance between the peak portion and the center axis X is preferably from 80% to 100% of the distance between the closest trough portion and the center axis X.

In the present embodiment, as illustrated in FIGS. 3A and 3B and FIGS. 6A to 6E, when the first side surface of the lower flange 60 is viewed from the axial direction of the center axis X, the outer shape of the first side surface preferably include a plurality of recessed curved sides and a plurality of rounded protrusion portions provided between adjacent sides, i.e., the sides of the convex polygon curve inward, and the corners are rounded. In the present embodiment, the outer shape has four sides. However, the shape may also preferably have three, five, or six sides.

In the present embodiment, as illustrated in FIGS. 3A and 3B and FIGS. 6A and 6D, when the second side surface of the upper flange 56 is viewed from the axial direction of the center axis X, the outer shape of the second side surface preferably include a plurality of sides and a plurality of rounded protrusion portions provided between adjacent sides, i.e., the convex polygon has rounded corners. In the present embodiment, the outer shape has six, eight, or ten sides. However, the shape may also preferably have three, four, or five sides.

The tire 10 includes such stud pins 50 mounted in the pin embedding holes provided in the tread portion.

The edge shape of the tip 52 as viewed from the axial direction of the center axis X preferably includes at least a protrusion portion, and the orientation position about the center axis X of the protrusion portion of the edge shape of the tip 52 is away from the orientation position about the center axis X of the peak portion of the second curved surface 56a of the upper flange 56. By the position of the protrusion portion of the tip 52 being aligned with the orientation position of the protrusion portion of the second curved surface 56a, powder-like microparticles produced by the protrusion portion of the tip 52 scraping against the asphalt road surface enter and get stuck between the peak portion of the upper flange 56 and the wall surface of the tread rubber, resulting in the tightening force of the tread rubber on the stud pin 50 being dispersed by the microparticles. As a result, the tightening force of the tread rubber on the stud pin 50 is weakened, and the stud pin 50 is more likely to fall out from the tire 10. Accordingly, the orientation position about the center axis X of the protrusion portion of the tip 52 is preferably away from the orientation position of the peak portion of the second curved surface 56a. Additionally, as illustrated in FIGS. 3A and 3B and FIGS. 6A to 6E, a recessed portion is preferably provided on the edge shape of the tip 52 at the same orientation position about the center axis X as the peak portion of the second curved surface 56a to prevent powder-like microparticles produced by the protrusion portion of the tip 52 scraping against the road surface from entering and getting stuck between the peak portion of the upper flange 56 and the wall surface of the tread rubber.

In the stud pin in an embodiment in which at least two sets of the first curved surface 60a and the second curved surface 56a are provided on the first side surface of the lower flange 60 and the second side surface of the upper flange 56, the stud pin 50 is preferably embedded in the tire with the orientation adjusted, such that at least two of the trough portions of the first curved surfaces 60a of such at least two sets have opposing positions regarding the center axis X, and are lying on a straight line parallel with the tire lateral direction or the tire circumferential direction. In this embodiment, the tread rubber moves as indicated by the arrow in FIG. 4 when the tip 52 receives breaking or accelerating force in the tire circumferential direction or lateral force in the tire lateral direction from the road surface, thus allowing the stud pin 50 to be resistant to falling out due to breaking or accelerating force and lateral force.

In this embodiment, the edge shape of the tip 52 as viewed from the center axis X preferably includes at least the protrusion portion, and the orientation position about the center axis X of the protrusion portion of the edge shape is away from the orientation position about the center axis X of two of the peak portions of two of the second curved surfaces 56a, 56a of at least two sets. In this way, powder-like microparticles produced by the protrusion portion of the tip 52 scraping against the asphalt road surface as described above can be prevented from entering and getting stuck between the peak portion of the upper flange 56 and the wall surface of the tread rubber, resulting in the tightening force of the tread rubber on the stud pin 50 being dispersed by the microparticles. This makes the stud pin 50 resistant to falling out from the tire 10.

In this embodiment, a recessed portion is preferably provided on the edge shape of the tip 52 at the same orientation position about the center axis X as at least two of the peak portions of the second curved surfaces 56a, 56a of at least two sets. This further prevents anything from entering and getting stuck between the peak portion of the upper flange 56 and the wall surface of the tread rubber.

EXAMPLES AND COMPARATIVE EXAMPLES

Various stud pins were manufactured. The manufactured stud pins were embedded in the tires 10 with the configuration illustrated in FIGS. 1 and 2 and these studded tires were mounted to a passenger vehicle and tested for pin drop resistance.

The size of each manufactured tire was 205/55R16. The passenger vehicle used was a front-wheel drive sedan with an engine displacement of 2000 cc. The internal pressure condition of the tires was 230 (kPa) for both the front wheels and rear wheels. The load condition of the tires was a 450 kg load on the front wheels and a 300 kg load on the rear wheels.

Pin drop does not occur often on icy road surfaces, however often occurs on dry road surfaces including asphalt road surfaces and concrete road surfaces. Thus, in the test for pin drop resistance, the proportion of the number of stud pins remaining in the tread portion to the total number of mounted stud pins was obtained after the passenger vehicle described above was driven for 10000 km on a dry road surface. The proportion of remaining stud pins is expressed as an index value with the proportion of remaining stud pins of the Comparative Example 1 being assigned as the reference (index value of 100). Larger index values indicate better pin drop resistance.

Example 1 has the configuration illustrated in FIGS. 3A and 3B with two sets of the peak portion of the upper flange 56 and the trough portion of the lower flange 60, except that one of the peak portions of the upper flange 56 has a linear shape rendering only one set of the peak portion and the trough portion.

Example 2 has the configuration illustrated in FIGS. 3A and 3B with two sets of the peak portion of the upper flange 56 and the trough portion of the lower flange 60.

Example 3 has the configuration illustrated in FIG. 6D with four sets of the peak portion of the upper flange 56 and the trough portion of the lower flange 60.

Comparative Example 4 has the configuration illustrated in FIGS. 3A and 3B with two sets of the peak portion of the upper flange 56 and the trough portion of the lower flange 60, except that the peak portion of the upper flange 56 and the trough portion of the lower flange 60 have orientation positions about the center axis X offset by 45 degrees.

The tip used in Comparative Examples 1 to 4 and Examples 1 to 3 has the configuration illustrated in FIG. 3A.

The specifications of the stud pin 50 and the results for pin drop resistance are shown in Tables 1 and 2 below.

TABLE 1

|  | Comparative Example 1 | Comparative Example 2 | Comparative Example 3 | Comparative Example 4 |
| --- | --- | --- | --- | --- |
| Upper flange trough portion or peak portion? | Peak portion | Trough portion | Trough portion | Peak portion |
| Lower flange trough portion or peak portion? | Peak portion | Trough portion | Peak portion | Trough portion |
| Upper flange trough portion or peak portion in same orientation position as lower flange peak portion or trough portion? | Yes | Yes | Yes | No |
| Number of sets of upper flange peak portion and lower flange trough portion in same orientation position | 0 | 0 | 0 | 0 |
| Recessed portion or protrusion portion of tip shape at same orientation position as upper flange trough portion or peak portion? | Recessed portion | Recessed portion | Recessed portion | Recessed portion |
| Pin drop resistance | 100 | 105 | 102 | 103 |

TABLE 2

|  | Example 1 | Example 2 | Example 3 |
| --- | --- | --- | --- |
| Upper flange trough portion or peak portion? | Peak portion | Peak portion | Peak portion |
| Lower flange trough portion or peak portion? | Trough portion | Trough portion | Trough portion |
| Upper flange trough portion or peak portion in same orientation position as lower flange peak portion or trough portion? | Yes | Yes | Yes |
| Number of sets of upper flange peak portion and lower flange trough portion in same orientation position | 1 | 2 | 4 |
| Recessed portion or protrusion portion of tip shape at same orientation position as upper flange trough portion or peak portion? | Recessed portion | Recessed portion | Recessed portion |
| Pin drop resistance | 110 | 115 | 118 |

As can be seen from Tables 1 and 2, the pin drop resistance of Examples 1 to 3 is five points or more greater than that of the Comparative Examples 1 to 4. This clearly demonstrates effects of the present embodiment.

A stud pin and a studded tire according to an embodiment of the present technology have been described in detail above. However, it should be understood that a stud pin and a studded tire according to an embodiment of the present technology is not limited to the above embodiments and examples, and may be improved or modified in various ways so long as these improvements or modifications remain within the scope of the present technology.

The invention claimed is:

1. A stud pin to be embedded in a pin embedding hole provided in a tread portion of a pneumatic tire, the stud pin comprising:
   a tip comprising a tip end surface configured to come into contact with a road surface; and
   a body portion provided around a center axis of the stud pin and configured to support the tip;
   the body portion comprising:
   an upper flange configured to fix the tip at a first end of the body portion;
   a lower flange provided on a position on a side opposite to the first end of the body portion; and
   a shank portion configured to connect the upper flange and the lower flange,
   the upper flange and the lower flange each comprising a side surface extending parallel with an axial direction of the center axis,
   a first side surface of the side surface of the lower flange comprising a first curved surface recessed inward in relation to the body portion, as viewed from the axial direction,
   a second side surface of the side surface of the upper flange comprising a second curved surface bulging toward a periphery of the body portion as viewed from the axial direction, and a pair of third curved surfaces or flat surfaces configured to connect the second curved surface to interpose the second curved surface, each of the pair of third curved surfaces or the flat surfaces having a smaller curvature along a periphery of the second side surface orthogonal to the axial direction than a curvature of the second curved surface, and
   a trough portion where the first curved surface is most recessed and a peak portion where the second curved surface is most bulged being located at an identical orientation position about the center axis, as viewed from the axial direction.

2. The stud pin according to claim 1, wherein when the peak portion and the trough portion are viewed from the axial direction, a position of the peak portion is aligned with a position of the trough portion or located on an inward side of the position of the trough portion in relation to the body portion.

3. The stud pin according to claim 1, wherein when the peak portion and the trough portion are viewed from the axial direction, a distance between the first curved surface and the second curved surface is reduced to a minimum distance at a position of the peak portion and a position of the trough portion.

4. The stud pin according to claim 1, wherein counting the first curved surface and the second curved surface as one set, the first side surface and the second side surface comprise at least two sets.

5. The stud pin according to claim 4, wherein counting the first curved surface and the second curved surface as one set, the first side surface and the second side surface comprise two sets, and
two first curved surfaces of the two sets are provided, at positions opposite one another regarding the center axis, on a periphery of the side surface.

6. The stud pin according to claim 4, wherein counting the first curved surface and the second curved surface as one set, the first side surface and the second side surface comprise four sets,
trough portions of four first curved surfaces of the four sets are provided at equal angular intervals about the center axis on a periphery of the first side surface, and
the peak portions of the four second curved surfaces of the four sets are provided at equal angular intervals about the center axis on the periphery of the second side surface.

7. The stud pin according to claim 4, wherein when at least two of peak portions and trough portions of at least two sets of the first side surface and the second side surface are viewed from the axial direction, positions of both of the at least two of the peak portions are aligned with a position of one of the at least two of the trough portions or located on an inward side of a position of a closest trough portion of the at least two of the trough portions in relation to the body portion.

8. The stud pin according to claim 1, wherein when the first side surface is viewed from the axial direction, an outer shape of the first side surface comprises a plurality of sides which are recessed and curved and a rounded protrusion portion provided between adjacent sides of the plurality of sides.

9. The stud pin according to claim 1, wherein when the second side surface is viewed from the axial direction, an outer shape of the second side surface comprises a plurality of sides and a rounded protrusion portion provided between adjacent sides of the plurality of sides.

10. A studded tire comprising a stud pin, the stud pin being mounted in a pin embedding hole provided in a tread portion,
the stud pin comprising:
a tip comprising a tip end surface configured to come into contact with a road surface; and
a body portion provided around a center axis of the stud pin and configured to support the tip;
the body portion comprising:
an upper flange configured to fix the tip at a first end of the body portion;
a lower flange provided on a position on a side opposite to the first end of the body portion; and
a shank portion configured to connect the upper flange and the lower flange,
the upper flange and the lower flange each comprising a side surface extending parallel with an axial direction of the center axis,
a first side surface of the side surface of the lower flange comprising a first curved surface recessed inward in relation to the body portion, as viewed from the axial direction,
a second side surface of the side surface of the upper flange comprising a second curved surface bulging toward a periphery of the body portion as viewed from the axial direction, and a pair of third curved surfaces or flat surfaces configured to connect the second curved surface to interpose the second curved surface, each of the pair of third curved surfaces or the flat surfaces having a smaller curvature along a periphery of the second side surface orthogonal to the axial direction than a curvature of the second curved surface, and
a trough portion where the first curved surface is most recessed and a peak portion where the second curved surface is most bulged being located at an identical orientation position about the center axis, as viewed from the axial direction.

11. The studded tire according to claim 10, wherein an edge shape of the tip as viewed from the axial direction of the center axis comprises at least a protrusion portion, and
an orientation position about the center axis of the protrusion portion of the edge shape is away from the orientation position about the center axis of the peak portion of the second curved surface.

12. The studded tire according to claim 11, wherein a recessed portion is provided on the edge shape at an identical orientation position about the center axis as the peak portion.

13. A studded tire comprising a stud pin, the stud pin being mounted in a pin embedding hole provided in a tread portion,
the stud pin comprising:
a tip comprising a tip end surface configured to come into contact with a road surface; and
a body portion provided around a center axis of the stud pin and configured to support the tip;
the body portion comprising:
an upper flange configured to fix the tip at a first end of the body portion;
a lower flange provided on a position on a side opposite to the first end of the body portion; and
a shank portion configured to connect the upper flange and the lower flange,
the upper flange and the lower flange each comprising a side surface extending parallel with an axial direction of the center axis,
a first side surface of the side surface of the lower flange comprising a first curved surface recessed inward in relation to the body portion, as viewed from the axial direction,
a second side surface of the side surface of the upper flange comprising a second curved surface bulging toward a periphery of the body portion as viewed from the axial direction, and a pair of third curved surfaces or flat surfaces configured to connect the second curved surface to interpose the second curved surface, each of the pair of third curved surfaces or the flat surfaces having a smaller curvature along a periphery of the second side surface orthogonal to the axial direction than a curvature of the second curved surface, and a trough portion where the first curved surface is most recessed and a peak portion where the second curved surface is most bulged being located at an identical orientation position about the center axis, as viewed from the axial direction, wherein counting the first curved surface and the second curved surface as one set, the first side surface and the second side surface comprise at least two sets, and at least two of trough portions of the at least two sets of the first side surface and the second side surface are located opposite one another regarding the center axis and lying on a straight line parallel with a tire circumferential direction or a tire lateral direction.

14. The studded tire according to claim 13, wherein an edge shape of the tip as viewed from the center axis comprises at least a protrusion portion, and an orientation position about the center axis of the protrusion portion of the edge shape is away from the orientation position about the center axis of the at least two of peak portions of the at least two sets of the first side surface and the second side surface.

15. The studded tire according to claim 14, wherein a recessed portion is provided on the edge shape at an orientation position about the center axis identical to the at least two of peak portions of the at least two sets of the first side surface and the second side surface.

* * * * *